United States Patent
Nelson et al.

[11] Patent Number: 6,054,521
[45] Date of Patent: Apr. 25, 2000

[54] EROSION RESISTANT-LOW SIGNATURE LINER FOR SOLID PROPELLANT ROCKET MOTORS

[75] Inventors: Ronald W. Nelson, Brigham City; Merylin B. Lovett, Pleasant View; Larry W. Poulter; Elizabeth K. Bonderson, both of Ogden, all of Utah

[73] Assignee: Cordant Technologies Inc., Salt Lake City, Utah

[21] Appl. No.: 08/986,875

[22] Filed: Dec. 8, 1997

Related U.S. Application Data

[60] Provisional application No. 60/032,675, Dec. 9, 1996.

[51] Int. Cl.[7] .............................. C08J 3/00; C08K 3/20; C08L 75/00; F02K 9/00
[52] U.S. Cl. ........................... 524/405; 60/253; 60/255; 60/265; 60/909; 29/890.01; 244/62; 523/138; 523/179; 523/180; 524/401; 524/430; 525/123; 525/455
[58] Field of Search .............................. 60/253, 255, 265, 60/909; 244/62; 29/890.01; 523/138, 179, 180; 524/401, 405, 430; 525/123, 455

[56] References Cited

U.S. PATENT DOCUMENTS

| | | |
|---|---|---|
| 2,682,515 | 6/1954 | Naps . |
| 3,073,799 | 1/1963 | Skiff . |
| 3,347,047 | 10/1967 | Hartz et al. . |
| 3,395,035 | 7/1968 | Strauss . |
| 3,457,215 | 7/1969 | Sommer . |
| 3,489,714 | 1/1970 | Sayles . |
| 3,491,055 | 1/1970 | Talley . |
| 3,536,656 | 10/1970 | Sommer . |
| 3,637,576 | 1/1972 | Sutherland . |
| 3,663,496 | 5/1972 | Whelan . |
| 3,726,829 | 4/1973 | Sayles ............................ 260/41.5 R |
| 3,855,176 | 12/1974 | Skidmore . |
| 3,875,106 | 4/1975 | Lazzaro . |
| 3,954,701 | 5/1976 | Schaffling . |
| 3,966,663 | 6/1976 | Sayles . |
| 4,088,806 | 5/1978 | Sawko et al. . |
| 4,101,475 | 7/1978 | Stalego . |
| 4,492,779 | 1/1985 | Junior et al. . |
| 4,595,714 | 6/1986 | McAllister et al. . |
| 4,600,732 | 7/1986 | Junior et al. . |
| 4,645,803 | 2/1987 | Kohli et al. . |
| 4,656,095 | 4/1987 | McAllister et al. . |
| 4,708,977 | 11/1987 | Miutel et al. . |
| 4,876,291 | 10/1989 | Dallavia, Jr. et al. . |
| 4,878,431 | 11/1989 | Herring . |
| 4,956,397 | 9/1990 | Rogowski et al. . |
| 5,352,312 | 10/1994 | Guillot . |
| 5,388,399 | 2/1995 | Figge et al. ............................ 60/253 |
| 5,401,793 | 3/1995 | Kobayashi et al. . |
| 5,453,453 | 9/1995 | Lamon et al. . |
| 5,472,644 | 12/1995 | Schubert ............................ 252/609 |

OTHER PUBLICATIONS

Hercules Aerospace Division, "High Performance Insulation Development", Jan. 1983, pp. 325.

*Primary Examiner*—Patrick D. Niland
*Attorney, Agent, or Firm*—Pillsbury Madison & Sutro LLP

[57] ABSTRACT

The present invention concerns an erosion resistant, low signature liner for solid propellant rocket motors and rocket motors having such a low signature liner. The liner combustion products in the exhaust plume have low visibility in the IR and visible light spectra which is essential for use in low signature solid propellant rocket motors. The liner also forms an in-situ protective layer at elevated temperatures for enhanced erosion resistance. These erosion resistant properties eliminate the need for supplemental case insulation which would contribute additional smoke and combustion products to the exhaust plume as well as add additional costs and inert weight to the motor.

42 Claims, 2 Drawing Sheets

EROSION RESISTANT-LOW SIGNATURE LINER FOR SOLID PROPELLANT ROCKET MOTORS

This application claims the benefit of U.S. Provisional No. 60/032,675, filed Dec. 9, 1996.

BACKGROUND OF THE INVENTION

1. Field of the Invention

The present invention relates to a novel erosion resistant, low signature liner developed for solid rocket motors, and rocket motors with such a liner.

2. Description of Related Art

Rocket motors employing solid propellants typically comprise a rigid outer casing or shell; a heat insulating layer (insulation) bonded to the inner surface of the casing; a liner layer bonded to the insulating layer; and a solid propellant grain bonded to the liner layer. The propellant grain is typically center perforated, and these center perforations generally contain fins or slots to tailor rocket motor ballistic performance. These fins and slots allow the flame front to reach localized regions of the liner and insulation prior to motor burn out which exposes these localized regions to high temperature and high velocity gas flow for an extended period of time. The insulation is generally fabricated from a composition capable of withstanding the high temperature and high velocity gases produced when the propellant grain burns, thus protecting the casing. However, the liner and insulation combustion products typically contribute significant amounts of smoke to the rocket motor exhaust plume.

The typical liner contains a polymeric binder, a bonding agent to reinforce the propellant (bond line) near the liner interface, and solid fillers to provide mechanical strength and rheology control for processing. The liner must be compatible with and bond to the propellant and insulation or case surface. For this reason the binder used in the liner typically, but not necessarily, has the same chemical functionality as the binder used in the propellant. The liner will therefore normally have the same curable polymer and curative as the propellant binder. The percent of binder used in the liner depends on requirements of the specific bond line system and can vary over wide ranges, such as 40% to 80%. The bonding agent used in typical liners is present in the uncured liner in an amount from 2% to 6%. Fillers that are normally used include asbestos, carbon powder, silicon dioxide, and sometimes titanium dioxide or other inorganic materials. The amount of filler typically ranges from 20% to 50%. Asbestos is undesired due to health hazards.

Advanced tactical rocket motors require certain stealth characteristics including a low observable exhaust plume in the IR and visible light spectra in order to avoid detection. This is typically achieved through the use of non-aluminized propellants or solid propellants containing low amounts of aluminum. However, combustion products from the liner and insulation can also contribute significantly to the exhaust plume signature. The use of both a liner and an insulator can add smoke to the exhaust plume and increase the cost and inert weight of the rocket motor. These traits are undesirable from the standpoint of economics, performance and a low signature plume.

Prior efforts to reduce the liner signature include the use of a titanium dioxide filler in the High-speed Anti Radiation Motor (HARM) liner. This liner has poor erosion resistance, however, and a substantial thickness of additional smoke generating insulation is required for protecting the rocket casing.

Flame retardants have been used commercially as visible smoke and afterglow suppressants for materials and coatings but have not been evaluated for IR signature, laser transmittance, radar cross section and other stealth qualities required for low signature rocket motor application.

Prior techniques to increase the erosion resistance of materials have included the use of asbestos, aramid and polybenzimidazole (PBI) fibers and fiber reinforced zinc borate (ZB) and alumina trihydrate (ATH) compositions, such as described in the literature, including U.S. Pat. Nos. 4,595,714; 4,656,095; 4,956,397; and 4,600,732. Except for asbestos, these fibers have typically not been used in liners due to processing problems attributable to the high viscosities due to the presence of fibers.

Despite these and other efforts, rocket motors with liners which have demonstrably improved stealth performance, and liners with better erosion resistance, reduced weight penalty, and more flexibility in fabrication have long been desired.

It has been desired to produce rockets with improved liners, and particularly solid propellant rockets equipped with such a liner, which have lower visibility exhaust signatures and avoid (or have at least reduced) high volumes of visible smoke. In particular, it would be a further advancement in the art to provide a liner which exhibits such low visible and IR smoke emissions as to be suitable for low signature, e.g. stealth, rocket motor applications.

It has also been desired to have liner formulations with erosion resistance at least about comparable to that obtained using conventional fiber-containing rocket motor insulation, but which are also capable of being successfully used as sprayable or pourable liner coatings. It has therefore been desired to avoid the high viscosities and processing problems heretofore associated with the high fiber loadings required to achieve a liner having good erosion resistance.

It would be an advancement in the art to provide a single layer of a liner material that would also bond the propellant grain to the casing, and that is heat and erosion resistant to protect the casing. This would reduce rocket motor fabrication costs and reduce inert motor weight to improve motor performance efficiencies.

It would be an advancement in the art to provide a liner that is erosion resistant and free of high fiber loadings.

It would be an advancement in the art to provide a liner formulation, e.g., curable composition, that has a sufficiently low viscosity for spray or brush application.

SUMMARY OF THE INVENTION

In accordance with one embodiment of the invention, these and other objects are satisfied by providing an erosion resistant, low signature rocket motor liner formed from a curable composition comprising at least one binder containing a plurality of first functional groups, at least one curative containing a plurality of second functional groups that are reactive with said first functional groups, and a powdered filler comprising at least one borate and at least one metal oxide. In accordance with another embodiment of the present invention, all or at least a portion of the aluminum trihydrate is replaced with a combination of $SiO_2$ and $TiO_2$.

The present liner provides excellent propellant to case bonding properties, and, during use in a rocket, emits low amounts of observable smoke in the IR and visible light spectra. The present liner also exhibits excellent heat and erosion resistant properties. The liner is filled with powdered refractory and/or ceramic precursor materials which suppress smoke. During use, the liner forms an in-situ sintered, protective layer at elevated temperatures. Because of its heat and erosion resistant properties, the disclosed liner can be used in many applications without need for the addition of a conventional fiber-reinforced case insulator, which avoids a weight penalty common to conventional rocket motors. The liner is compatible with reduced signature exhaust plume applications. The liner is, by preference, at least essentially fiber-free, and in particular is preferably asbestos-free.

A rocket motor provided with such a liner can have low signature characteristics, or exhibit advantageously lower signature characteristics compared to the heretofore known solid propellant motors equipped with conventional liners. In particular, these rockets are tactical rocket motors which have a higher propellant burn rate than a space launch rocket motor.

These and other objects, features, and advantages of the present invention will become apparent from the following detailed description when taken in conjunction with the accompanying drawings which illustrate, by way of example, the principles of the present invention.

BRIEF DESCRIPTION OF THE FIGURES

The accompanying drawings illustrate the present invention. In such drawings.

DESCRIPTION OF PREFERRED EMBODIMENTS

Figure 1:
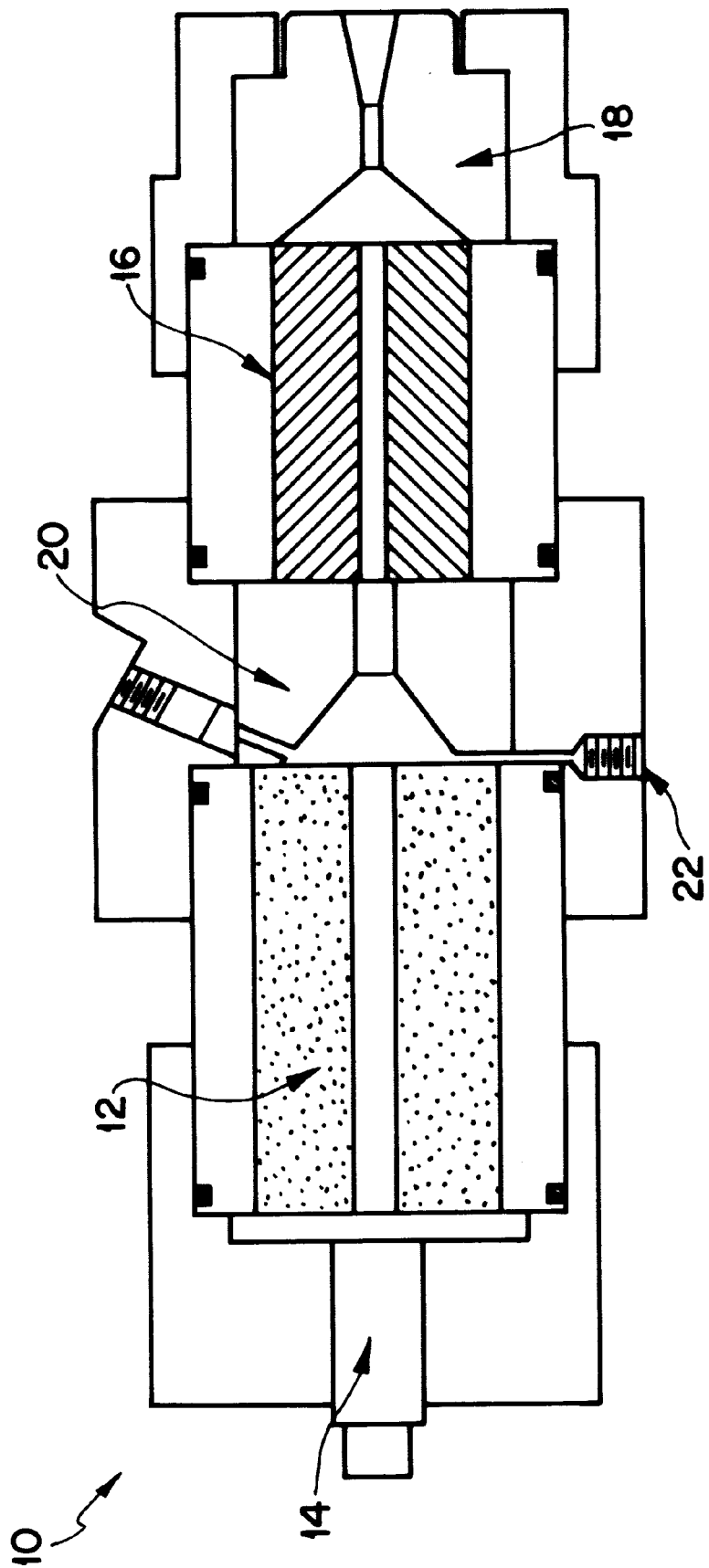
FIG. 1 depicts a subscale test motor.

A liner can be obtained from a curable and sprayable formulation comprising (in unreacted form) binder, curing agent, catalyst, fillers and thixotropes.

In general, the binder comprises a polymer composition (including curative) suitable for use in binder applications for rocket motors, preferably solid rocket motors. In general, binders such as polyurethanes, polysulfides and epoxies can be used.

By present preference, the binder comprises a polymer having reactive hydroxy or thiol groups, or their chemical equivalent. The binder can comprise, for instance, a urethane system with a prepolymer binder with reactive hydroxy functionality (or chemical equivalent) and a curative therefor. As used herein, a pre-polymer binder includes organic compounds having at least two reactive hydrogen providing moieties, preferably hydroxy or thiol moieties, capable of reacting with a polyisocyanate to form urethane or thiourethane linkages. The pre-polymer and curative each have a minimum reactive functionality (average) of 2, although higher average functionalities can be used, such as reactive functionalities of 2.5, 3 or higher, if desired. The presently preferred prepolymers are compounds represented by the generic formula:

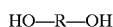

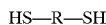

wherein R represents a difunctional organic moiety. In general, R represents the pre-polymer backbone and is a hydrocarbon chain, which may or may not contain one or more hetero atoms. The hydrocarbon chain can contain unsaturation, such as the backbone to a —OH or —SH terminated polybutadiene, and, if desired hetero atoms, such as oxygen or sulphur, as is known to those skilled in the art. The reactive hydroxyl or thiol groups can be of any type suitable for forming urethane or thiourethane linkages with isocyanate groups. Pre-polymers can include hydroxy or equivalent functionalized polybutadienes, polyethylene oxides, and polyesters, among others. Hydroxy terminated polybutadiene (HTPB) polymers are the currently preferred binders.

Formulations can contain from 10% by weight to about 85% by weight, more particularly from about 30% by weight to about 75% by weight, and preferably about 35% by weight to 40% by weight of binder (curable polymer or pre-polymer, plus curative) relative to the total weight of the liner formulation. One preferred formulation uses 37% of the binder. The amount of the individual components will depend on the selected ratio of equivalents of isocyanate to hydroxyl functionalities. It will also depend on the selected amount of catalyst. In general the isocyanate to hydroxyl equivalent ratio will vary between 1.0 and 1.6. As disclosed hereinbelow, the catalyst level will vary between 0.0% and 1.0%.

When the liner is used with propellants with other binder systems, such as polysulfides or epoxies, the liner binder system may be changed to match chemically the propellant binder system, such as to ensure acceptable bond between the propellant and liner.

The amount of curing agent selected will be governed by its functionality and the amount of binder, and can thus be characterized as being used in an amount effective for curing the curable polymer or pre-polymer component of the binder. Indeed, the amount of curative is, in general, unique to a specific polymer. Curing agents for the preferred embodiment can comprise at least one multifunctional isocyanate. Suitable curing agents for the preferred embodiment include, among others, polyisocyanates such as di-, tri-, and higher-functional organic isocyanates. Diisocyanates are currently more preferred. Both alkylene and arylene isocyanates are suitable, but alkylene isocyanates are preferred. Polyisocyanates include m-tetramethyl xylene diisocyanate (TXMDI), isophorone diisocyanate (IPDI), dimeryl diisocyanate (DDI) biuret triisocyanate and toluene 2,4-diisocyanate (TDI).

The presently preferred binder can, if desired, include at least one catalyst. For instance, with a hydroxy-terminated polymeric binder, catalysts, such as the delayed quick cure catalysts disclosed in U.S. Pat. No. 4,184,031, can be used. A catalyst can function as a cure-rate regulating agent. Dibutyl tin dilaurate and triphenyl bismuth are exemplary. More particularly, triphenyl bismuth and maleic anhydride is an illustrative delay-quick cure catalyst system which can be used to catalyze a urethane-type crosslinking reaction. In general the amount of catalyst is less than about 1% by weight, but the amount used will depend on the catalyst selected and on the cure rate requirements for the curable liner formulation.

Powdered fillers are included in the present liner. By preference, a combination of at least two fillers are added to reinforce the liner, and to enable it to exhibit increased erosion resistance and reduced smoke evolution during use with an operational rocket motor. The fillers useful herein can provide a combination of functions as described hereinbelow. The filler generally comprises a combination of at least two components, a borate, such as a metal borate, e.g., zinc borate, and a metal oxide filler, such as alumina trihydrate. A preferred embodiment comprises a polyurethane liner filled with zinc borate (e.g., $2ZnO.3B_2O_3.3.5H_2O$), alumina trihydrate and titanium dioxide. The three preferred materials can be used in combination to effectively reduce smoke emission in the IR and visible spectra and form a hard, sintered, protective layer at elevated temperatures for enhanced erosion resistance. The liner formula generally contains about 15%–90% by weight of a combination of zinc borate and aluminum trihydrates. The respective amounts of these two fillers can be in a range of about 5% by weight to about 50% by weight for the borate, about 5% by weight to about 50% by weight for the metal oxide filler. One formulation contains equal amounts of zinc borate and alumina trihydrate. An exemplary such formulation contains 25% by weight each of zinc borate and alumina trihydrate, with 10% by weight being a remaining filler, such as $TiO_2$ and $SiO_2$, as disclosed further hereinbelow.

The zinc borate can be in hydrated form ($2ZnO.3B_2O_3.3.5H_2O$) which contains about 14 percent water of hydration in which the water generally releasable at a temperature range of about 290° C.–450° C. A suitable zinc borate is commercially available from U.S. Borax ("FIREBRAKE"). The zinc borate can also be deemed a fire retardant and/or smoke/afterglow suppressant. The zinc borate is in fine particulate form, e.g. pulverulent form. Average particle sizes can be in the range of up to about 50 microns, although other average particle sizes may be used. A commercial source or zinc borate is thought to have an average particle size of about 7 microns.

The alumina trihydrate ($Al_2O_3.3H_2O$) generally contains about 34.6% water of hydration in which the water is generally releasable at a temperature in the range of about 220° C.–450° C., and a suitable such trihydrate is available from Alcoa (Hydril 710). The alumina trihydrate has sometimes been called a flame retardant. The aluminum trihydrate is in fine particulate form, e.g. pulverulent form. Average particle sizes can be up to 50 microns, although other average particle sizes can, if desired, be used. A commercially available alumina trihydrate has an average particle size of about 1 micron or greater. Descriptions of zinc borate and alumina trihydrate include, for instance, Miller, *Plastics World*, 28–38 (March 1994).

In a preferred embodiment, a third filler component, titanium dioxide ($TiO_2$), is present. The $TiO_2$ can comprise the white, anatase crystalline form of the metal oxide. $TiO_2$ is used commercially as a white pigment. The titanium dioxide is generally in fine particulate form, e.g., pulverulent form. The $TiO_2$ can be used, as with the other "fillers", with average particle sizes being micron sized, e.g., of up to about 50 microns, although a commercially available $TiO_2$ (Baker Chemicals) in powdered form has an average particle size of about 1 to 2 microns.

Fundamentally, the particle sizes are sufficiently fine to ensure ease in formulating the present liner formulation.

Still other filler materials can additionally be included in the liner formulation to meet the requirements of a specific motor system. Illustrative additional or auxiliary fillers include, among others, silicon dioxide, calcium or alumina silicates, ammonium polyphosphate, diammonium phosphate, and oxamide.

The formulation also preferably, but not necessarily, contains at least one constituent which can function as a thixotrope to control and tailor the rheology of the liner formulation. The thixotrope can be present in the formulation in an amount sufficient to effect the desired rheological modification to the uncured liner formulation. In general, a constituent functioning as a thixotrope can be included in the binder formulation in an amount of about 1–3% by weight, relative to the total weight of the liner formulation. The actual amount can be varied depending on the type of thixotrope selected. An exemplary thixotrope comprises fumed silica oxide, manufactured by Cabot under the trade name CAB-O-SIL (e.g., "TS-720"), which in general is of a different and smaller average particle size (such as 0.05 to less than 1 micron) than a silicon dioxide which can be used, if desired, as a filler. Other thixotropes include, for instance poly substituted sorbitols or some organic waxes or oil derivatives, such as THIXCIN-E. Depending on the thixotrope selected and the desired performance characteristics of the liner, the mechanical and Theological properties can be changed by selecting the type of $TiO_2$ and average particle size of $TiO_2$ and $SiO_2$, and in principle all or at least a portion of the aluminum trihydrate can be replaced with a combination of $SiO_2$ and $TiO_2$. For instance, in one embodiment, a liner formulation contains 10% by weight of $TiO_2$ and $SiO_2$ and 25% by weight aluminum trihydrate. For illustration, the following combinations are noted: 25% by weight zinc borate, 25% by weight alumina trihydrate, 9% by weight $TiO_2$, and 1% by weight of $SiO_2$; and 29.5% by weight of zinc borate, about 0% alumina trihydrate, 29.5% $TiO_2$ and about 1% by weight of $SiO_2$. Of the latter examples, the second was less erosion resistant that the first (0.049 in/sec versus 0.042 in/sec) at a short burn time of about 1 second, although both were better than a base line carbon-filled liner (0.077 in/sec.).

The liner formulation can, if desired, include at least one bonding agent or bond promoter. These are typically mobile, reactive ingredients which diffuse from the liner into the interfacial propellant and react with the oxidizer, such as an ammonium perchlorate oxidizer, propellant binder or other propellant ingredients to enhance bond line properties. Exemplary bond promoters include, for instance, di- and tri-functional aziridine (i.e., cyclic ethylene imines) compounds. Suitable cyclic amines include, by example 1,1-[1, 3-phenylene dicarbonyl bis(2-methylaziridine)] (known in the industry as HX-752 from 3M) and trimesoyl 1-(2-ethyl) aziridine (known in the industry as HX-868 from 3M). These materials can be included in the formulation in amounts effective to enhance bond line strengths, and, in general, can be used in amounts ranging from about 0 to about 8% by weight, and more particularly from about 2 to about 4% by weight, relative to the total liner formulation.

A particularly useful exemplary liner formulation is described in Table I.

TABLE I

Liner Formulation

| Ingredient | Function | Composition (wt %) |
|---|---|---|
| Hydroxy terminated Polybutadiene (HTPB) | Curable polymer | 36.8 |
| Multifunctional isocyanate (dimethyldiisocyanate) | Curing agent | |
| Multifunctional aziridine (HX-752) | Bonding agent | 3.0 |

TABLE I-continued

Liner Formulation

| Ingredient | Function | Composition (wt %) |
|---|---|---|
| Triphenyl Bismuth (TPB) | Catalyst | 0.1 |
| Maleic Anhydride | Catalyst | 0.1 |
| Zinc borate (ZB) | Filler | 25.0 |
| Alumina trihydrate (ATH) | Filler | 25.0 |
| Titanium dioxide | Filler | 9.0 |
| Fumed silica oxide | Thixotrope | 1.0 |

The present liner formulation can be applied to the inside surface of a rocket motor casing, such as a solid propellant rocket motor casing, by coating the casing with the liner formulation and then curing the liner formulation. The liner can be applied to the interior surface of the rocket motor by such techniques as spraying, brushing (including hand brushing), slush lining, and rotary atomization ("sling lining"). Slush lining involves adding a large excess of uncured liner formulation then allowing the excess to drain out of the rocket motor. Spray and rotary atomization methods adaptable for applying the liner formulation are disclosed in *Perry's Chemical Engineers Handbook*, Section 18, pages 58–66 (5th Edition). Once the liner has been applied, it can be partially or fully cured before loading the propellant. Propellant loading can be accomplished using such techniques as propellant casting. Whether the liner formulation is first fully or partially cured prior to loading the propellant into the rocket motor depends on the bond line and process requirements for a given solid propellant rocket motor.

The thickness of the cured liner formulation will, of course, depend on the particular solid propellant rocket motor, and the size of the motor. In principle, for a small tactical solid propellant rocket motor, such as the Mark 66, a thickness of about 40 mils may be sufficient.

A solid propellant rocket motor provided with a cured liner according to the present invention can be characterized as low signature solid propellant rocket motor. Such a rocket motor can be further characterized as emitting reduced amounts of smoke in the visible light and IR spectra. The liner is resistant to erosion by high temperature, high velocity propellant exhaust gases from the rocket motor; and provides excellent propellant to case bonding. The liner formulation has a low viscosity for ease of processing.

Conventional tensile bond line samples were used to assess the bond strength of the liner to the case and propellant. Conventional radiant intensity, light output and laser transmittance tests were used to evaluate the exhaust plume signature. However, in order to evaluate the erosion resistance of the disclosed liner, a discriminating test method was developed to simulate the rocket motor environment. A subscale test motor, described in FIG. 1, was developed and used for this evaluation. The motor, which is generally designated by reference number 10, contains a center perforated propellant grain 12, an igniter 14, a material test chamber containing test article 16, a nozzle 18, a graphite insert 20, and a pressure port 22. The nozzle was sized ($D_T$=0.25 in) to provide a chamber pressure of 500 psi and a burn time of one second with a reduced smoke HTPB propellant. The relatively short burn time was used to measure the initial transient erosion rate, characteristic of a short burn time motor application, rather than an average, equilibrated erosion rate characteristic of a longer burn duration. The material test chamber bore was sized (adhesive bore=0.50 in) to achieve an initial gas velocity of 0.15 mach number. Material erosion was determined by removing the char layer formed during the test and measuring the increase in bore diameter. Half of the increase in bore diameter divided by the exposure time gives the transient erosion rate in inches/second.

The invention is further described in the following non-limiting Examples.

EXAMPLES

A full scale MK66 test motor was used to obtain the signature data reported herein. The MK 66 solid-propellant rocket motor is used primarily as an air to ground saturation weapon for battlefield support. This motor is approximately 2.75 inches in diameter and 36 inches long. It burns for approximately one second with the liner exposed during the final half second.

The erosion data was obtained from tests conducted on sub-scale test motors.

Example 1

Smoke Evolution

Figure 2:
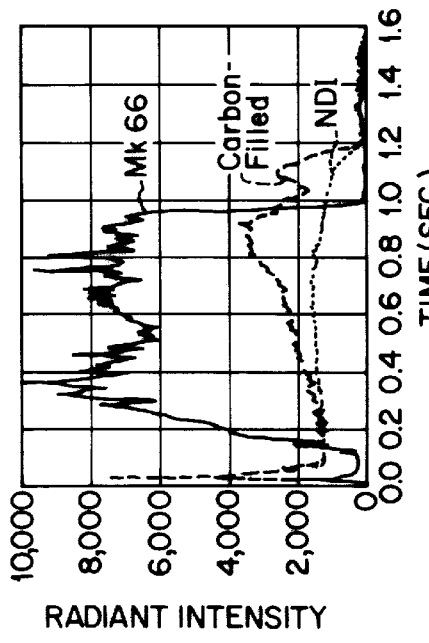
FIG. 2 and FIG. 3 represent the radiant intensity of the exhaust plume in the IR region of 2.0 to 2.6 microns and 3.2 to 4.8 microns as represented in Example 1.
Figure 3:
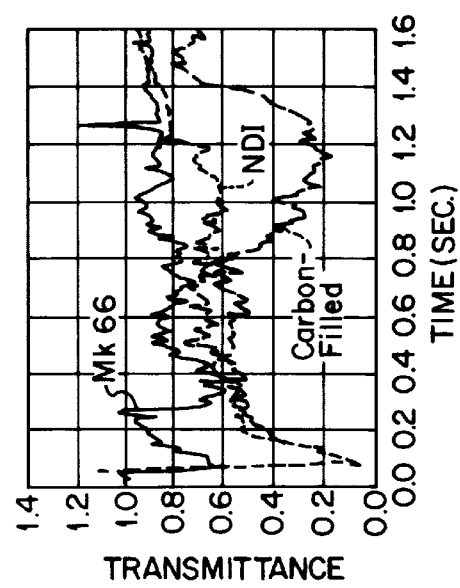
Figure 4:
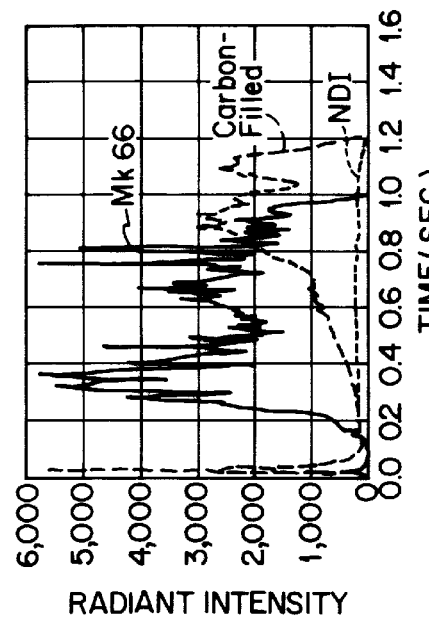
FIG. 4 represents the visible light output of the exhaust plume as reported in Example 1.
Figure 5:
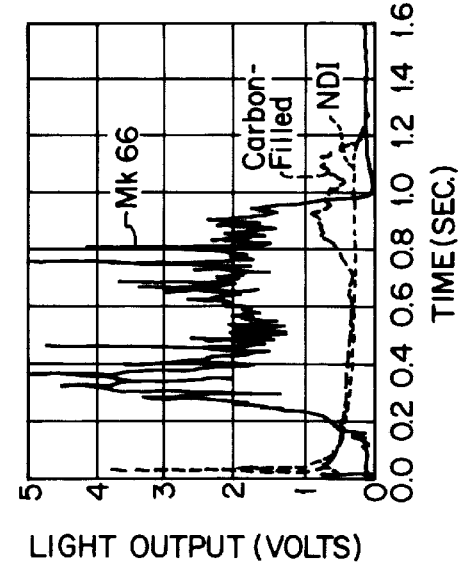
FIG. 5 represents a comparison of laser transmittance through the exhaust plume as reported in Example 1.

Full scale MK 66 motors were used to quantify exhaust plume signature in the IR and visible light spectra. Three conditions were evaluated. The first condition was the baseline MK 66 motor. The second condition was an improved MK 66 motor with a low signature propellant and a conventional carbon filled liner. The third condition, designated Hydra-70 NDI, was the improved MK 66 motor with a low signature propellant and the present, low signature liner. FIGS. 2 and 3 represent the radiant intensity of the exhaust plume in the IR region of 2.0 to 2.6 microns and 3.2 to 4.8 microns, respectively. FIG. 4 represents the visible light output of the exhaust plume. These figures show a very high signature of the baseline motor throughout the one second burn. The improved MK 66 plume shows a reduced signature during the first half of the burn but increasing in the second half of the burn as the carbon filled liner is exposed. The improved motor with the disclosed liner (Hydra-70 NDI) shows a low signature throughout the entire burn. FIG. 5 indicates a comparison of laser transmittance through the exhaust plume. It indicates a reduction in transmittance during the last half of the burn for the carbon filled liner and a consistently high transmittance with the disclosed liner. The difference between the "carbon-filled" and "NDI" curves illustrate the substantial signature reduction afforded by the disclosed liner.

Example 2

Bonding

A curable urethane-type liner (HTPB-based) was formulated in accordance with Table I using an NCO/OH ratio of 1.35 and applied to an graphite/epoxy substrate to a thickness of 40-mils. The liner was cured for 16 hours at 135° F. A 88% solids, HTPB reduced smoke propellant was vacuum cast onto the lined samples and cured for 96 hours at 160° F. The tensile strength of the propellant to liner to composite case substrate was tested. The results are presented in Table II.

TABLE II

Propellant/Liner/Case Bond Data

Tensile Test

| Temp (° F.) | Rate (in/min) | Average (psi/pli) | CV (%) | Failure Mode |
|---|---|---|---|---|
| −65° | 20.0 | 458 | 10 | Composite Case |
| +70 | 2.0 | 168 | 3 | Propellant |
| +140 | 0.02 | 88 | 5 | Propellant |

The above data demonstrate excellent bond strength with failure occurring in the propellant or case substrate.

Example 3

Erosion Resistance

Four liner compositions were prepared in accordance with Table I, but with filler substitutions, and tested for erosion resistance. They included a powdered carbon (baseline), a carbon fiber/ZB/ATH, powdered carbon/ZB/ATH and a TiO$_2$/ZB/ATH filled formulation. The results are summarized in Table III.

TABLE III

Liner Erosion Summary

| Test | Carbon | Microcarbon fiber | TiO$_2$ | ZB | ATH | Erosion Rate (in/sec) | Visc (kP) |
|---|---|---|---|---|---|---|---|
| A | 50 | | | | | 0.077 | 1.55 |
| B | | 10 | | 25 | 25 | 0.045 | 1.27 |
| C | 10 | | | 25 | 25 | 0.043 | 1.16 |
| D | | | 10 | 25 | 25 | 0.043 | 0.67 |

Formulations B, C and D all exhibited substantially lower erosion rates than the carbon filled baseline liner (formulation A). The viscosities of formulations B and C were excessive, however, and the microcarbon fibers in formulation B tended to separate and clump. The viscosity of formulation D was in an acceptable range for brushing and spraying. The above data demonstrate that a titanium dioxide, zinc borate, alumina trihydrate filled liner exhibits acceptable viscosity for spray or brush application and demonstrates improved erosion resistance over the carbon filled baseline. They also demonstrate that a fiber reinforcement is not required for good transient erosion resistance.

The foregoing detailed description of the preferred embodiments of the invention has been provided for the purposes of illustration and description. It is not intended to be exhaustive or to limit the invention to the precise embodiments disclosed. The embodiments were chosen and described in order to best explain the principles of the invention and its practical application, thereby enabling others skilled in the art to understand the invention. While the invention has been described in connection with what is presently considered to be the most practical and preferred embodiments, it is understood that the invention is not limited to the disclosed embodiments, but, to the contrary, is intended to cover various modifications and equivalent arrangements included within the spirit and scope of the appended claims.

What is claimed is:

1. An erosion resistant, low signature rocket motor liner, said liner formed from a curable composition comprising:
   at least one binder containing a plurality of first functional groups;
   at least one curative containing a plurality of second functional groups that are reactive with said first functional groups; and
   a powdered filler comprising at least one borate and at least one metal oxide present in effective amounts to make said rocket motor liner erosion resistant.

2. A liner according to claim 1, wherein said at least one borate is zinc borate.

3. A liner according to claim 1, wherein said at least one metal oxide is alumina trihydrate.

4. A liner according to claim 1, wherein said at least one borate is zinc borate, and further wherein said at least one metal oxide is alumina trihydrate.

5. A liner according to claim 1, wherein said powdered filler further comprises titanium dioxide.

6. A liner according to claim 1, wherein said at least one borate is zinc borate, wherein said at least one metal oxide is alumina trihydrate, and further wherein said powdered filler further comprises titanium dioxide.

7. A liner according to claim 1, wherein said at least one borate is zinc borate, wherein said at least one metal oxide is alumina trihydrate, and further wherein said powdered filler further comprises titanium dioxide and silica.

8. A liner according to claim 1, wherein said powdered filler constitutes about 15 wt % to about 90 wt % of said liner in an uncured state, and wherein said powdered filler contains about 5 wt % to about 50 wt % borate and about 5 wt % to about 50 wt % of said metal oxide.

9. A liner according to claim 1, wherein said first functional groups include hydroxy groups or thiol groups, and wherein said at least one curative is a polyisocyanate.

10. A liner according to claim 9, wherein said at least one binder is hydroxy-terminated polybutadiene or thiol-terminal polybutadiene.

11. A liner according to claim 1, wherein said curable composition is at least essentially fiber-free.

12. A liner according to claim 1, wherein said curable composition is asbestos-free.

13. An erosion resistant, low signature rocket motor liner, said liner formed from a curable composition comprising:
    at least one binder containing a plurality of first functional groups;
    at least one curative containing a plurality of second functional groups that are reactive with said first functional groups; and
    a powdered filler comprising at least one borate, titanium dioxide and at least one metal oxide present in effective amounts to make said rocket motor liner erosion resistant.

14. A liner according to claim 13, wherein said at least one borate is zinc borate.

15. A liner according to claim 13, wherein said first functional groups include hydroxy groups or thiol groups, and wherein said at least one curative is a polyisocyanate.

16. A liner according to claim 15, wherein said at least one binder is hydroxy-terminated polybutadiene or thiol-terminal polybutadiene.

17. A liner according to claim 13 wherein said curable composition is at least essentially fiber-free.

18. A liner according to claim 13 wherein said curable composition is asbestos-free.

19. A solid propellant rocket motor comprising:
    a rigid casing;
    a solid propellant grain; and an erosion resistant, low signature liner interposed between said casing and said propellant grain, said liner being formed from a curable composition comprising at least one binder containing a plurality of first functional groups, at least one curative containing a plurality of second functional groups that are reactive with said first functional groups, and a powdered filler comprising at least one borate and at least one metal oxide.

20. A solid propellant rocket motor according to claim 19, wherein said at least one borate is zinc borate.

21. A solid propellant rocket motor according to claim 19, wherein said at least one metal oxide is alumina trihydrate.

22. A solid propellant rocket motor according to claim 19, wherein said at least one borate is zinc borate, and further wherein said at least one metal oxide is alumina trihydrate.

23. A solid propellant rocket motor according to claim 19, wherein said powdered filler further comprises titanium dioxide.

24. A solid propellant rocket motor according to claim 19, wherein said at least one borate is zinc borate, wherein said at least one metal oxide is alumina trihydrate, and further wherein said powdered filler further comprises titanium dioxide.

25. A solid propellant rocket motor according to claim 19, wherein said at least one borate is zinc borate, wherein said at least one metal oxide is alumina trihydrate, and further wherein said powdered filler further comprises titanium dioxide and silicon dioxide.

26. A solid propellant rocket motor according to claim 19, wherein said powdered filler constitutes about 15 wt % to about 90 wt % of said liner in an uncured state, and wherein said powdered filler contains about 5 wt % to about 50 wt % borate and about 5 wt % to about 50 wt % of said metal oxide.

27. A solid propellant rocket motor according to claim 19, wherein said first functional groups include hydroxy groups or thiol groups, and wherein said at least one curative is a polyisocyanate.

28. A solid propellant rocket motor according to claim 27, wherein said at least one binder is hydroxy-terminated polybutadiene or thiol-terminal polybutadiene.

29. A solid propellant rocket motor according to claim 19 wherein said curable composition is at least essentially fiber-free.

30. A solid propellant rocket motor according to claim 19 wherein said curable composition is asbestos-free.

31. A solid propellant rocket motor according to claim 19, further comprising a heat insulating layer interposed between said casing and said liner.

32. A solid propellant rocket motor comprising:

a rigid casing;

a solid propellant grain; and an erosion resistant, low signature liner interposed between said casing and said propellant grain, said liner being formed from a curable composition comprising at least one binder containing a plurality of first functional groups, at least one curative containing a plurality of second functional groups that are reactive with said first functional groups, and a powdered filler comprising at least one borate, titanium dioxide and silicon dioxide.

33. A solid propellant rocket motor according to claim 32, wherein said at least one borate is zinc borate.

34. A solid propellant rocket motor according to claim 32, wherein said first functional groups include hydroxy groups or thiol groups, and wherein said at least one curative is a polyisocyanate.

35. A solid propellant rocket motor according to claim 32, wherein said at least one binder is hydroxy-terminated polybutadiene or thiol-terminal polybutadiene.

36. A solid propellant rocket motor according to claim 32 wherein said curable composition is at least essentially fiber-free.

37. A solid propellant rocket motor according to claim 32 wherein said curable composition is asbestos-free.

38. A solid propellant rocket motor according to claim 32, further comprising a heat insulating layer interposed between said casing and said liner.

39. A liner according to claim 11, wherein said curable composition is sprayable.

40. A liner according to claim 17, wherein said curable composition is sprayable.

41. A solid propellant rocket motor according to claim 29, wherein said curable composition is sprayable.

42. A solid propellant rocket motor according to claim 36, wherein said curable composition is sprayable.

* * * * *